United States Patent [19]

Duchesneau et al.

[11] Patent Number: 4,533,296
[45] Date of Patent: Aug. 6, 1985

[54] PITCH CONTROL SYSTEM FOR VARIABLE PITCH PROPELLER

[75] Inventors: Jerome G. Duchesneau, Andover; Robert A. Schwartz, Vernon, both of Conn.

[73] Assignee: United Technologies Corporation, Hartford, Conn.

[21] Appl. No.: 549,537

[22] Filed: Nov. 7, 1983

[51] Int. Cl.³ .............................................. B64C 11/40
[52] U.S. Cl. ...................................... 416/46; 416/47; 416/153
[58] Field of Search .................. 416/25, 27, 30, 36, 416/44, 46, 47, 48, 153

[56] References Cited

U.S. PATENT DOCUMENTS

| | | | |
|---|---|---|---|
| 2,552,131 | 5/1951 | Adams | 416/30 |
| 2,632,516 | 3/1953 | Longfellow | 416/46 |
| 2,652,122 | 9/1953 | Longfellow | 416/46 |
| 2,663,373 | 12/1953 | Richmond | 416/46 |
| 2,664,960 | 1/1954 | Longfellow et al. | 416/46 |
| 2,738,022 | 3/1956 | Zwack | 416/47 |
| 2,798,563 | 7/1957 | Miller et al. | 416/48 X |
| 2,809,702 | 10/1957 | Lambeck et al. | 416/48 |
| 2,840,169 | 6/1958 | Farkas | 416/30 |
| 3,102,596 | 9/1963 | Newton et al. | 416/46 |
| 3,163,232 | 12/1964 | Grindle | 416/46 X |

FOREIGN PATENT DOCUMENTS

| | | | |
|---|---|---|---|
| 809171 | 2/1959 | United Kingdom | 416/162 |
| 1041353 | 9/1966 | United Kingdom | 416/46 |

Primary Examiner—Everette A. Powell, Jr.
Attorney, Agent, or Firm—John Swiatocha

[57] ABSTRACT

A propeller pitch control system having a mechanical low pitch stop which includes an electrical backup therefor. The backup comprises an electrically operatable means (245) to effect blade pitch adjustment toward feather under conditions of failure of the low pitch stop indicated by propeller operation at pitch angles in the range of beta operation, but power settings in the range of normal engine speed governor pitch control. Such operating conditions actuate a pair of switches (190 and 195) connecting the means (245) to a voltage source to increase blade pitch toward feather, thereby preventing overspeed operation of the propeller.

7 Claims, 1 Drawing Figure

U.S. Patent  Aug. 6, 1985  4,533,296
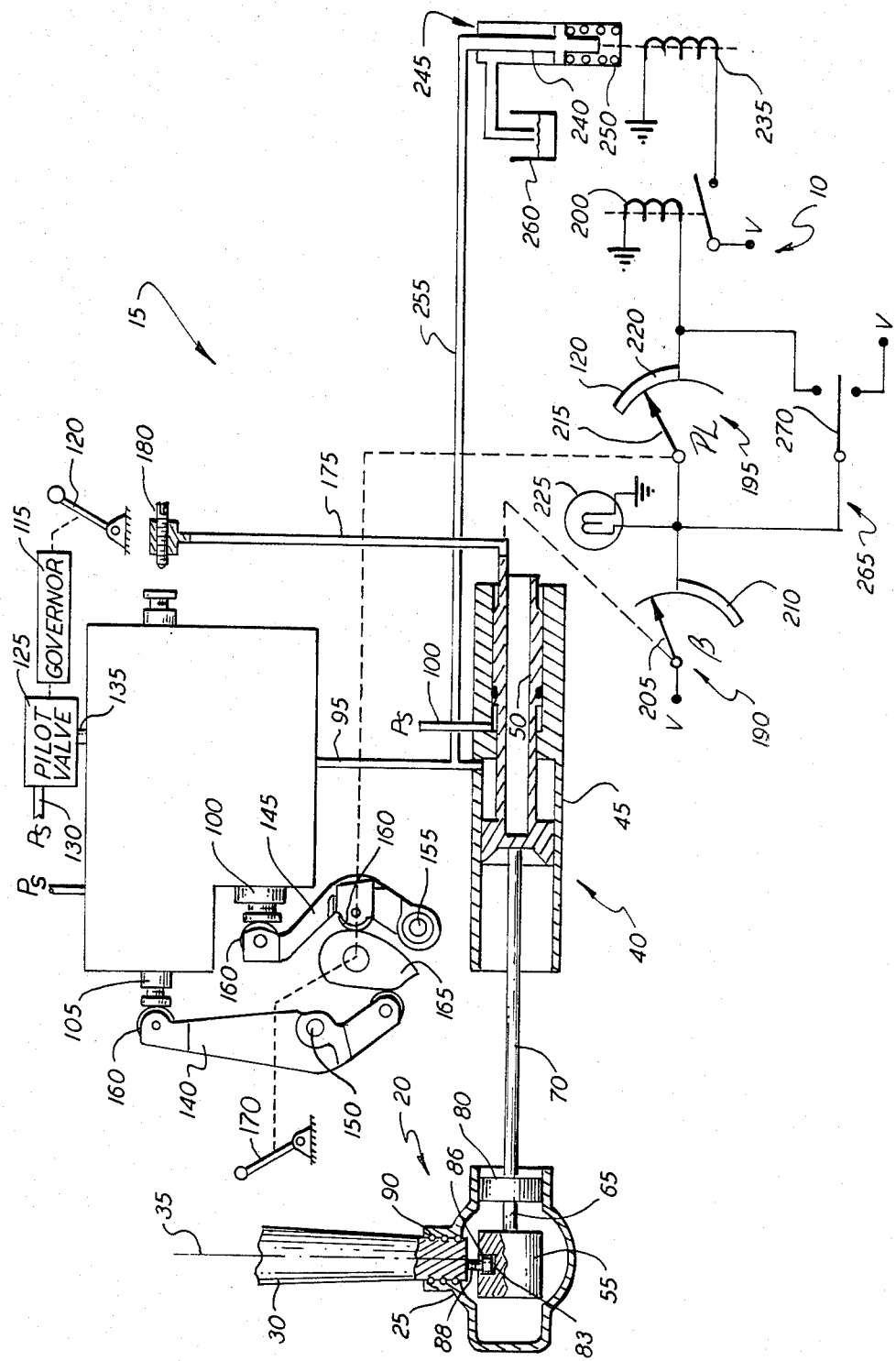

PITCH CONTROL SYSTEM FOR VARIABLE PITCH PROPELLER

DESCRIPTION

1. Technical Field

This invention relates generally to a pitch control system for a variable pitch propeller and more particularly to a backup for the low pitch stop of such a system.

2. Background Art

It has long been known to control the operation of propeller driven aircraft (particularly the speed of the aircraft engine) by varing the pitch of the individual blades of the aircraft propeller(s). Typically, to control engine speed while the aircraft is in flight, the pilot sets a condition lever, adjusting the setting of an engine speed governor which, at the highest range of blade pitch settings, actuates a pitch actuator to adjust propeller blade pitch independently of engine output power. Such adjustments to blade pitch effect corresponding adjustments in the "bite" of the propeller blades to thereby control engine speed.

The output power of the aircraft engine is controlled by an engine power lever or a "joystick" which, like the condition lever, is adjusted by the pilot. It has been the practice to control propeller blade pitch by an adjustment of the power lever independently of the engine speed governor when the aircraft is in a low power mode of operation such as, for example, in a taxi mode of operation. Such direct power lever control of blade pitch, commonly known as beta control, is associated with operation at the lowest range of blade pitch angles. The blade pitch angle corresponding to the transition from governor pitch control to beta pitch control is known as a "low pitch angle".

Frequently, aircraft propeller pitch control systems are provided with mechanical low pitch stops which mechanically prevent operation of the propeller at high power levels and pitch angles in the lower, beta range. As those skilled in the art will appreciate, operation at such high power, low pitch angle conditions would result in severe engine and propeller overspeed conditions and the possible, if not probable destruction of those systems attendant with such operation. For purposes of safety and minimization of the risk of damage to the engine and propeller, a backup to the mechanical low pitch stop is desirable.

DISCLOSURE OF INVENTION

Accordingly, it is among the objects of the present invention to provide an effective backup to a mechanical low pitch stop normally provided in a propeller pitch control system.

This and other objects which will become more apparent from the following detailed description taken in connection with the appended claims and accompanying drawing, are achieved by the present invention which comprises an electrical backup to the normal mechanical low pitch stop which prevents governor control of blade pitch angles in the low, beta range. In accordance with one aspect of the present invention, the backup comprises an electrically operated means for effecting an adjustment of blade pitch toward feather and a pair of switches connecting the electrically operated means to a suitable voltage source. One of the switches is actuated by blade pitch angle settings in the beta range and the other is actuated by elevated power lever settings corresponding to governor control of blade pitch. Operation of the propeller at elevated power settings simultaneously with pitch settings in the beta range (indicative of a malfunction of the mechanical low pitch stop) actuates both switches, connecting the electrically operated means to the voltage source to increase blade pitch.

In accordance with another aspect of the present invention, a circuit is also provided for testing the electrical backup system, the circuit comprising a means for applying voltage to one of the switches for the testing thereof without influence of the other switch. The testing circuit also includes means for short circuiting the one switch for testing the other.

BRIEF DESCRIPTION OF DRAWING

The sole FIGURE is a schematic drawing of a pitch control system for variable pitch propeller embodying the present invention.

BEST MODE FOR CARRYING OUT THE INVENTION AND INDUSTRIAL APPLICABILITY

Referring to the drawing, the present invention shown generally at 10 is part of a pitch control system 15 for a variable pitch propeller 20 which includes a hub 25 supporting one or more blades 30 which are adjusted in pitch by pivotal movement thereof about longitudinal axis 35 in response to operation of pitch change actuator 40. Actuator 40 includes a cylinder 45 having a piston 50 reciprocable therewithin. Piston 50 connects to cam 55 by connecting rods 65 and 70 and bearing pack (rotary to nonrotary interface) 80. Cam 55 includes a slot 83 therein within which roller 86 is received, the roller being mounted to trunion 88 extending radially inwardly from the root of blade 30. Those skilled in the art will recognize that reciprocation of actuator piston 50 effects a similar reciprocation of cam 55, engagement of the roller with slot 83 causing a rotation of the blade on bearings 90 about axis 35 to adjust blade pitch.

The description of the variable pitch propeller system given hereinabove forms no part of the present invention and is merely exemplary of a common type of variable pitch propeller system with which the invention hereof may be employed.

It will be understood by those skilled in the art that the magnitude of propeller blade pitch change effected by actuator 40 is determined by the admission of hydraulic fluid thereto and the draining of fluid therefrom. As shown in the drawing, metered fluid is admitted to the actuator through first conduit 95, such fluid pressurizing the piston for movement thereof to the left, in a direction tending to decrease blade pitch. Fluid at a constant supply pressure $P_S$ is provided to the actuator through second fluid conduit 100, this fluid pressurizing the piston for movement thereof to the right in a direction effecting an increase in blade pitch. As indicated in the drawing, the piston area pressurized by fluid from conduit 95 is substantially larger (on the order of twice) than the area of the piston pressurized by fluid in conduit 100. Accordingly, those skilled in the art will recognize piston 50 as a "half area piston" wherein the application through first fluid conduit 95 to the piston 50 of one-half the pressure $P_S$ (supply pressure) which is applied to the right-hand portion of the piston, will balance the piston against movement thereof. It will be seen that adjustment of the pressure in first fluid conduit 95 upwardly or downwardly from $P_S/2$ adjusts the force on the left end of the piston upwardly or downwardly to achieve a desired piston displacement.

Metered fluid is supplied to first conduit 95 through valve module 100 comprising valves 105 and 110 which control the normal transition of control system 15 from blade pitch control by means of an engine speed governor to beta control by means of a more direct mechanical connection between the engine power lever and the blades.

The engine speed governor, shown at 115 comprises any state of the art speed governor such as any of various centrifugal governors connected to and set by a pilot's condition lever 120. The governor is mechanically connected to a pilot valve 125 provided with hydraulic fluid at supply pressure $P_S$ from conduit 130.

As is well known in the art, adjustment of condition lever 120 adjusts the setting of governor 115 which in turn adjusts pilot valve 125. The pilot valve establishes a metered pressure in line 135, this metered pressure being ducted to conduit 95 and hence actuator 45 through the valve module. The operation of the condition lever, the governor and pilot valve to achieve a metered pressure is well known in the art and forms no part of the invention herein. For a description of a suitable governor-pilot valve subsystem, reference is made to U.S. Pat. No. 3,068,943 to Fischer.

Valves 105 and 110 are engageable with, and operated by crank arms 140 and 145 pivotally mounted at 150 and 155, respectively. Each of the crank arms includes rollers 160 where the arm engages a respective one of the valves and where the arm engages a cam 165 connected to, and pivotally moved by power lever ("joy stick") 170.

The end of valve 105 opposite that which engages crank arm 140 is engageable by the upper end of a generally L-shaped bracket 175 fixed to and movable with actuator piston 50 and having an abutment 180 threaded into the upper end thereof. Decreasing blade pitch (movement of actuator piston 50 to the left) causes abutment 180 to engage and then move the actuatable portion of valve 105 to the left. Assuming that such actuation of valve 105 cuts off metered pressure in line 135 from line 95 and, by means of this valve, crank arm 140 and cam 165, provides a solid mechanical connection between power lever 170 and actuator piston 50, those skilled in the art will appreciate that abutment 180 functions as a mechanical low pitch stop—converting the control system from governor to beta (direct power lever) control. Those skilled in the art will also appreciate that a failure of the low pitch stop due to, for example, the breakage thereof, or a failure of valve 105 could lead to a failure of the system to convert itself from governor to beta modes of operation, thereby risking overspeed operation of the propeller and possbile destruction of the propeller and associated engine.

The electrical backup system 10 of the present invention ensures against such overspeed operation and the effects thereof. Referring again to the drawing, backup system 10 comprises a pair of serially connected potentiometers (switches) 190 and 195 connecting a voltage source V to a relay 200. As shown, potentiometer 190 includes a movable contact 205 connected to and operated by actuator piston 50 and a stationary contact 210 whereby potentiometer 190 is conductive only when contacts 205 and 210 engage one another. Likewise, potentiometer 195 is provided with a movable contact 215 connected to and operated by power lever 170 and a stationary contact 220 whereby potentiometer 195 is conductive only when contacts 215 and 220 engage one another.

Potentiometer 190 is calibrated so that it is conductive (actuated) at actuator piston positions corresponding to the propeller blades being set below the low pitch angle in the beta operating range. A bulb 225 may be provided, connecting potentiometer 190 with ground to provide a visual indication of propeller operation in the beta range. Potentiometer 195 is calibrated so that it is conductive (actuated) at power lever positions corresponding to engine speed governor control occurring normally at blade pitch settings above the low pitch angle.

The core of relay 200 is mechanically connected to, and operates a switch 230 which when closed, connects a solenoid 235 to voltage source V. The movable core of solenoid 235 is connected to, and operates the movable element 240 of an electrically operable means (feather valve) 245 for adjusting blade pitch which is normally maintained closed by return spring 250. Feather valve 245 is disposed in fluid communication with the left side of actuator piston 50 by means of conduit 255, the opening of valve 245 connecting the actuator piston to drain 260 whereby supply pressure applied to the right side of piston 50 from line 100 moves the piston to the right, thereby increasing blade pitch toward feather.

Another switch 265 having movable contact 270 is connected across potentiometer 215. As shown, movable contact 270 may occupy one of three positions. In the first position (shown), the switch is open for normal operation of the backup system. In the second (upper) position, potentiometer 195 is short circuited, the connection of the feather solenoid with voltage source V being controlled entirely by potentiometer 190. In the third (lower) position, voltage is applied directly to potentiometer 195 whereby that device alone controls the connection of the feather solenoid to the voltage source.

The operation of the electrical backup to the mechanical low pitch stop is as follows. Under conditions of normal operation of propeller 20 with the engine speed governor controlling blade pitch, the switch positions are as illustrated and element 240 of feather valve 245 seals actuator cylinder 45 from drain 260. Under normal beta control operating conditions with blade pitch being controlled by power lever setting, movable contact 205 of potentiometer 190 would engage contact 210 thereof and movable contact 215 of potentiometer 195 would disengage itself from stationary contact 220 thereof whereby actuator cylinder 45 would remain sealed from drain 260 by feather valve 245. However, in the event of a malfunction of mechanical low pitch stop 175 wherein the propeller would experience governor control of blade pitch at low (beta) pitch settings, actuator 45 would connect contact 205 with contact 210 in potentiometer 190 and power lever 170 would connect contacts 215 and 220 in potentiometer 195. Closing of both potentiometers in this manner would actuate relay 200, connecting feather solenoid 235 with voltage source V, thereby actuating feather valve 245 to open a passage between conduit 255 and drain 260. Such a connection causes the left side of the pitch acutator to drain whereby hydraulic fluid at supply pressure applied to the right side of piston 50 moves the piston in an increasing pitch direction toward feather position without impediment by any metered pressure at the left side of the piston. As pitch angle increases, piston 50 moves contact 205 off contact 210 when the pitch angle reaches the predetermined low pitch angle. This causes potentiometer 190 to disconnect solenoid 235 from the voltage source, thereby allowing feather valve 245 to close the connection of actuator 40 to drain. Cylinder 40 is then repressurized from conduit 95, terminating the continued increase in blade pitch. Continuation of the malfunction of the mechanical low pitch stop will again cause the blade angle to decrease, reclosing contacts 205 and 210 to reconnect the feather valve to the voltage source and again drain the left side of the actuator. Thus, it will be seen that the electrical backup modulates about the low pitch angle setting, holding blade pitch to that setting to prevent further overspeed operation.

The backup system is conveniently checked by operation of switch 265. Before operation of the propeller, actuation of this switch to move contact 270 to its upper position short circuits potentiometer 195 whereby movement of the blades to pitch setting in the beta range would, if potentiometer 190 is functioning properly, result in a blade pitch setting at the low pitch angle. Actuation of switch 265 to move contact 270 to its lower position applies voltage V directly to potentiometer 195 whereby a power lever setting corresponding to governor control of blade pitch would, if potentiometer 195 is functioning properly, connect feather valve 245 directly to the voltage source to drain cylinder 45 and thus feather the blades.

Accordingly, it is seen that the system of the present invention provides an effective backup for the mechanical low pitch stop in the event of a malfunction or failure thereof. While a particular embodiment of this invention has been shown, it will be understood that various modifications will, without departure from this invention, suggest themselves to those skilled in the art from the disclosure herein. For example, potentiometers 190 and 195 could be replaced by switches having discrete "on" and "off" positions. Likewise, normally deenergized feather solenoid 235 could be replaced by a normally energized solenoid and the system modified so that the solenoid is disconnected from the voltage source by operation in the beta pitch angle range at power lever settings corresponding to engine speed governor control. Similarly, where the pulling force on the core of relay 200 is of sufficient magnitude, solenoid 235 may be eliminated and valve element 240 connected directly to the relay for operation thereby. It is intended by the following claims to cover these and all other modifications which fall within the true spirit and scope of this invention.

Having thus described the invention, what is claimed is:

1. A pitch control system for variable pitch propeller powered by an engine, said pitch control system including means for controlling blade pitch in response to the output power of said engine being in a first range corresponding to a first range of blade pitch angle settings greater than a predetermined low pitch angle; beta means for controlling blade pitch in a second range of blade pitch angle settings less than said low pitch angle; and a mechanical low pitch stop for preventing control of blade pitch within said second range by other than said beta means, said system being characterized by an electrically operated backup for said mechanical low pitch stop, said backup comprising:
    a voltage source;
    a first switch actuatable by adjustment of blade pitch to angles less than said low pitch angle;
    a second switch actuatable by adjustment of engine power to levels within said first range thereof; and
    electrically operable means for adjusting the pitch of said propeller blades, said electrically operable pitch adjusting means being adapted for connection to a voltage source and actuation thereby for driving said blades toward feather by actuation of said first and second switching means under conditions of a malfunction of said mechanical low pitch stop.

2. The pitch control system of claim 1 characterized by said first and second switches being serially connected.

3. The pitch control system of claim 1 characterized by an hydraulic actuator connected to said blades for driving said blades in the adjustment of pitch thereof, said electrically operated pitch adjusting means comprising an electrically operated valve for controlling the fluid pressurization of said actuator.

4. The pitch control system of claim 3 characterized by said electrically operated valve connecting said hydraulic actuator to drain, said valve when actuated, causing a draining of said actuator for driving said blades toward feather.

5. The pitch control system of claim 1 characterized by:
    first means, said first means applying said voltage source directly to one of said switches, thereby simulating actuation of the other of said switches for the testing said one switch without influence of said other switch; and
    second means, said second means short circuiting said one switch, thereby simulating actuation thereof for testing said other switch without influence of said one switch.

6. The pitch control system of claim 5 characterized by:
    said first means comprising a third switch connected between said voltage source and a point on said circuit between said first and second switches; and
    said second means comprising a fourth switch connected across said second switch.

7. The pitch control system of claim 1 characterized by said third and fourth switches comprising a single conductor connected to said point on said circuit between said first and second switches and movable connection with said voltage source and connection across said second switch.

* * * * *